Jan. 15, 1952

O. E. WIDÉN 2,582,664

APPARATUS FOR REMOVING NONDESIRABLE
SUBSTANCES FROM COCOA BERRIES
Original Filed Feb. 20, 1941

INVENTOR
OLOF E. WIDEN
BY Young, Emery & Thompson
ATT/s.

Patented Jan. 15, 1952

2,582,664

UNITED STATES PATENT OFFICE 2,582,664

APPARATUS FOR REMOVING NONDESIRABLE SUBSTANCES FROM COCOA BERRIES

Olof Edwin Widén, Ljungsbro, Sweden

Original application February 20, 1941, Serial No. 379,898. Divided and this application February 27, 1948, Serial No. 11,764. In Sweden March 4, 1940

1 Claim. (Cl. 99—236)

It is previously known to remove the non-desirable, taste-impairing organic substances contained in the cocoa berry by chonching. This chonching takes place after the cocoa has been admixed with sugar and dry-milk, if desired, that is to say, the chocolate mass would, simultaneously with the mixing thereof, be relieved of said substances through the influence of the air. However, this method has proved to be very tedious and troublesome. Endeavours have been made previously to accelerate the procedure by blowing air through the mass. This procedure, however, also would not yield entirely satisfactory results.

The present invention refers to means, by means of which said substances may be removed rapidly and effectively from the cocoa mass, that is to say, the treatment takes place prior to the admixture of sugar and milk. According to the invention, the apparatus comprises a cylindrical receptacle which is closed at the ends thereof, and in which is rotatably mounted a shaft carrying a number of arms extending at right angles thereto, said arms carrying, in turn, stirring arms paralleling the shaft, which latter arms are adapted to cooperate with rigid arms secured in the head plates of the receptacle, the upper portion of the receptacle having one or more suction openings provided therein, which openings are preferably arranged in some of the rigidly secured arms, for instance in those adjacent to the bottom of the receptacle. The receptacle may be provided with a suction opening for the cocoa mass, so that when the same is placed under vacuum, the mass will be sucked through a pipe, conduits being then provided with suitably arranged cocks. To facilitate the tapping of the mass from the receptacle, the latter may also be arranged to be placed under a pressure above atmospheric, so that the mass may be pressed over into a store container for the treated mass.

Figure 1:
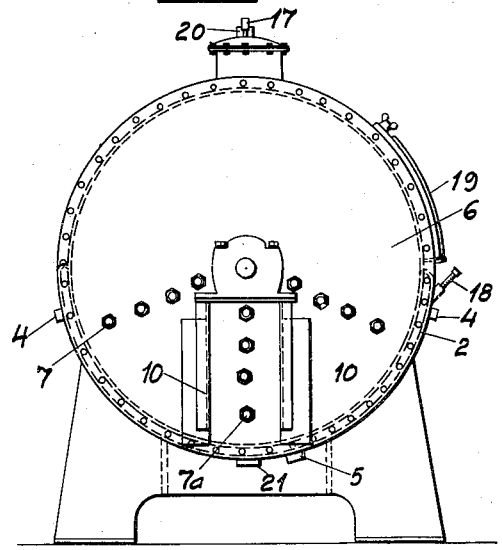
Figure 2:
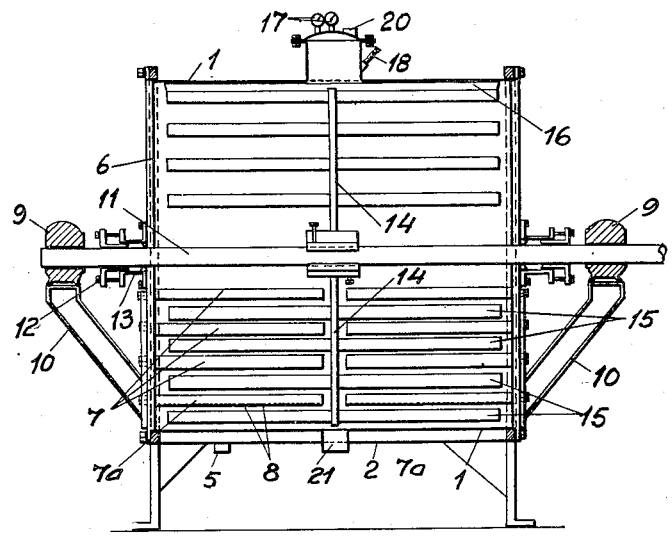

A form of embodiment of the invention is illustrated in the accompanying drawings. Figs. 1 and 2 show the receptacle proper viewed from the end and in a longitudinal section respectively.

1 designates the cylindrical casing of the receptacle and 2 an external casing extending from the bottom and upwardly half-way the height of the receptacle. In the use of the apparatus steam or hot water intended for the heating of the cocoa mass is introduced into the space between the two casings, such steam or hot water being led in and off through sockets 4 and 5 respectively. Screwed into the head walls 6 of the receptacle are a number of arms 7, the embodiment shown having three groups of arms comprising four arms each, out of which the two lower arms 7a are hollow and provided with downwardly located openings 8 for the steam, ammonia gas and air. A shaft 11 extending through the receptacle is mounted in bearings 9 on supporting arms 10 at the center of the head walls 6, said shaft being provided at its entrance into the receptacle with stuffing boxes 13. In the embodiment shown, four arms 14 are secured to the shaft 11, said arms carrying stirring arms 15 paralleling the shaft 11. According to the drawing, each arm 14 has four stirring arms 15 secured thereto, said stirring arms entering the intermediate spaces between the arms 7. One of the outer arms is provided with a scraper 16, which is adapted during operation continuously to scrape off chocolate mass that would otherwise burn fast to the cylinder wall. The receptacle is provided in known manner with non-return valves combined with meters 17 for pressures above and below atmospheric, and is also fitted with thermometers 18 to indicate the internal temperature of the receptacle as well as the temperature of the steam or water, there being also provided a door 19 to facilitate access to the interior of the receptacle. In its upper part the receptacle is provided with a socket 20 through which air may be sucked out and pressed in respectively. Provided at the bottom of the receptacle is a socket 21 for the cocoa mass.

Obviously, the apparatus may be varied in many respects, without departing from the basic principle of the invention. Thus a number of valves may be replaced by two-way and three valves or non-return valves.

This application is a division of my co-pending application, Serial No. 379,898, filed February 20, 1941, now Patent Number 2,441,861.

What I claim is:

Apparatus for removing the non-desirable organic substances contained in the cocoa berry, comprising a hollow cylindrical receptacle closed at the ends thereof and having head walls, said receptacle having a shaft rotatably mounted therein carrying a number of arms extending at right angles thereto, stirring arms mounted on the first-mentioned arms paralleling the shaft, and a plurality of arms rigidly secured in the head walls of the receptacle and cooperating with the stirring arms, the upper part of the receptacle having provided therein at least one suction opening and at least one opening for steam near the bottom of the receptacle, said receptacle being provided with a suction opening for the cocoa mass, so that when the same is placed under vacuum, the mass may be sucked through a pipe conduit from a storage container for the non-treated mass, and the receptacle being also provided with a tapping opening, said suction and tapping openings joined into a common opening in which is provided a T-coupling fitted with valves.

OLOF EDWIN WIDÉN.

REFERENCES CITED

The following references are of record in the file of this patent:

UNITED STATES PATENTS

| Number | Name | Date |
|---|---|---|
| 215,139 | Lightcap | May 6, 1879 |
| 237,003 | Emery | Jan. 25, 1881 |
| 1,035,842 | Anderson | Aug. 20, 1912 |
| 1,050,738 | Hollstein | Jan. 14, 1913 |
| 1,123,595 | Roberts | Jan. 5, 1915 |
| 1,207,573 | Gloor | Oct. 17, 1916 |
| 1,653,281 | Hess | Dec. 20, 1927 |
| 2,059,504 | Phelan et al. | Nov. 3, 1936 |
| 2,216,777 | Hollstein | Oct. 8, 1940 |
| 2,236,554 | Wiamer | Apr. 1, 1941 |

FOREIGN PATENTS

| Number | Country | Date |
|---|---|---|
| 103,494 | Sweden | Nov. 13, 1941 |
| 297,054 | Great Britain | June 6, 1929 |
| 662,531 | France | Jan. 6, 1928 |